(12) United States Patent
Zhang et al.

(10) Patent No.: US 9,585,052 B2
(45) Date of Patent: Feb. 28, 2017

(54) DETERMINING A TRAFFIC BEARER FOR DATA TRAFFIC BETWEEN A TERMINAL AND A CONTENT DATA SOURCE OF A CONTENT DATA NETWORK

(75) Inventors: Shunliang Zhang, Beijing (CN); Xuejun Cai, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/387,306

(22) PCT Filed: Mar. 27, 2012

(86) PCT No.: PCT/CN2012/073140
§ 371 (c)(1),
(2), (4) Date: Sep. 23, 2014

(87) PCT Pub. No.: WO2013/143072
PCT Pub. Date: Oct. 3, 2013

(65) Prior Publication Data
US 2015/0049612 A1    Feb. 19, 2015

(51) Int. Cl.
*H04W 28/02*    (2009.01)
*H04W 4/18*    (2009.01)
(Continued)

(52) U.S. Cl.
CPC ......... *H04W 28/0252* (2013.01); *H04W 4/18* (2013.01); *H04W 28/0289* (2013.01);
(Continued)

(58) Field of Classification Search
None
See application file for complete search history.

(56) References Cited

U.S. PATENT DOCUMENTS

2006/0291412 A1\* 12/2006 Naqvi ................... H04M 7/123
370/328
2009/0047951 A1\* 2/2009 Yeoum ................... H04W 8/06
455/435.1
(Continued)

FOREIGN PATENT DOCUMENTS

CN    101616058 A    12/2009
CN    102014053 A     4/2011
(Continued)

OTHER PUBLICATIONS

Ma, Longjiao, and Wenjing Li. "Traffic offload mechanism in EPC based on bearer type." In Wireless Communications, Networking and Mobile Computing (WiCOM), 2011 7th International Conference on, pp. 1-4. IEEE, 2011.\*
(Continued)

*Primary Examiner* — Benjamin Lamont
(74) *Attorney, Agent, or Firm* — Murphy, Bilak & Homiller, PLLC (57) ABSTRACT

A method for determining a traffic bearer for data traffic between a terminal (106) of a mobile network (102) and a content data source (116) of a content data network (104) is described. The method comprises sending (126) a service request for data of the content data source (116) from the terminal (106) to a network gateway (110) of the mobile network (102), and determining (132) an edge entity (108) of the mobile network (102). The edge entity (112) is adapted to forward the data traffic between the content data source (116) and the mobile network (102). The method comprises sending (130) a bearer establishment request to a control node (108) of the mobile network (102) for establishing the traffic bearer (389, 589) to the edge entity (112), and directing (154) the data traffic associated with the content data source (116) to the traffic bearer. Therefore a delivery of data between the content data source (116) of the (Continued)

content data network (104) and the terminal (106) may be enabled, which delivery may deploy few mobile network resources and may cause a high user experience of an end user associated with the terminal (116) requesting the data from the content data source (116).

10 Claims, 8 Drawing Sheets (51) Int. Cl.
*H04W 76/02* (2009.01)
*H04W 36/12* (2009.01)
*H04W 88/16* (2009.01)
*H04W 92/06* (2009.01)

(52) U.S. Cl.
CPC ............ *H04W 76/02* (2013.01); *H04W 36/12* (2013.01); *H04W 88/16* (2013.01); *H04W 92/06* (2013.01)

(56) References Cited

U.S. PATENT DOCUMENTS

| | | | | |
|---|---|---|---|---|
| 2009/0318147 A1* | 12/2009 | Zhang | ............... | H04W 8/26 455/435.1 |
| 2011/0007748 A1* | 1/2011 | Yin | ............... | H04L 45/00 370/401 |
| 2011/0111758 A1* | 5/2011 | Liu | ............... | H04W 76/021 455/435.2 |
| 2011/0131338 A1* | 6/2011 | Hu | ............... | H04W 76/02 709/229 |
| 2011/0235614 A1* | 9/2011 | Lerzer | ............... | H04W 76/021 370/331 |
| 2011/0320554 A1* | 12/2011 | Melander | ............... | H04L 67/104 709/206 |
| 2012/0003980 A1 | 1/2012 | Lim et al. | | |
| 2012/0036266 A1* | 2/2012 | Yin | ............... | H04L 61/2015 709/226 |
| 2012/0099429 A1* | 4/2012 | Ludwig | ............... | H04L 43/028 370/235 |
| 2012/0166618 A1* | 6/2012 | Dahod | ............... | H04L 47/20 709/224 |
| 2012/0218975 A1* | 8/2012 | Aramoto | ............... | H04W 80/04 370/331 |
| 2012/0224536 A1* | 9/2012 | Hahn | ............... | H04L 45/00 370/328 |
| 2012/0269167 A1* | 10/2012 | Velev | ............... | H04W 36/0011 370/331 |
| 2012/0284756 A1 | 11/2012 | Kotecha et al. | | |
| 2012/0294163 A1* | 11/2012 | Turtinen | ............... | H04W 72/042 370/252 |
| 2013/0007287 A1 | 1/2013 | Chu et al. | | |
| 2013/0034057 A1* | 2/2013 | Aramoto | ............... | H04W 36/0011 370/328 |
| 2013/0051326 A1* | 2/2013 | Jeyatharan | ............... | H04L 47/245 370/328 |
| 2013/0053027 A1* | 2/2013 | Lau | ............... | H04W 76/022 455/432.1 |
| 2013/0064086 A1* | 3/2013 | Hall | ............... | H04W 28/08 370/231 |
| 2013/0089076 A1 | 4/2013 | Olvera-Hernandez et al. | | |
| 2013/0097305 A1* | 4/2013 | Albal | ............... | H04W 76/00 709/224 |
| 2013/0114432 A1* | 5/2013 | Haynes | ............... | H04W 76/041 370/252 |
| 2013/0155903 A1* | 6/2013 | Bi | ............... | H04B 7/024 370/255 |
| 2013/0157661 A1* | 6/2013 | Bhaskaran | ............... | H04W 60/00 455/436 |
| 2013/0230011 A1* | 9/2013 | Rinne | ............... | H04W 76/02 370/329 |
| 2013/0230024 A1* | 9/2013 | Lim | ............... | H04W 36/14 370/331 |
| 2014/0105011 A1* | 4/2014 | Chandramouli | ............... | H04W 4/08 370/230 |
| 2014/0177446 A1* | 6/2014 | Sun | ............... | H04L 45/38 370/236 |
| 2014/0206349 A1* | 7/2014 | Bertrand | ............... | H04W 40/246 455/434 |
| 2014/0219093 A1* | 8/2014 | Damola | ............... | H04L 47/805 370/235 |

FOREIGN PATENT DOCUMENTS

| | | | | |
|---|---|---|---|---|
| CN | 102202418 A | 9/2011 | | |
| CN | 102356616 A | 2/2012 | | |
| SE | WO 2011144700 A1 * | 11/2011 | ............ | H04W 28/08 |
| WO | 2011137564 A1 | 11/2011 | | |
| WO | 2012052064 A1 | 4/2012 | | |
| WO | 2012052067 A1 | 4/2012 | | |
| WO | 2012052568 A1 | 4/2012 | | |
| WO | 2012088140 A2 | 6/2012 | | |
| WO | WO 2012112571 A1 * | 8/2012 | ......... | H04L 12/2803 |
| WO | 2012172384 A1 | 12/2012 | | |
| WO | 2013001230 A1 | 1/2013 | | |
| WO | 2013022219 A1 | 2/2013 | | |
| WO | 2013143072 A1 | 10/2013 | | |

OTHER PUBLICATIONS

ZTE. Discussion on LIPA_Sipto Solution, 3GPP TSG WG2 Meeting #76, TS S2-096637, Nov. 16-20, 2009, Cabo, Mexico, pp. 1-6.*
3GPP, "3rd Generation Partnership Project; Technical Specification Group Services and System Aspects; LIPA Mobility and SIPTO at the Local Network; (Release 12)", 3GPP TR 23.859 V0.6.0, Jul. 2012, 1-60.
Unknown, Author, "Device Management Architecture", Open Mobile Alliance, Candidate Version 2.0, OMA-AD-DM-V2_0-20120531-C, May 31, 2012, 1-16.
3GPP, "3rd Generation Partnership Project; Technical Specification Group Services and System Aspects; Local IP Access and Selected IP Traffic Offload (LIPA-SIPTO) (Release 10)", 3GPP TR 23.829 V10.0.1, (Oct. 2011), 1-43.
3GPP, "3rd Generation Partnership Project; Technical Specification Group Services and System Aspects; Architecture enhancements for non-3GPP accesses (Release 12)", 3GPP TS 23.402 V12.0.0 (Mar. 2013), Mar. 2013, 1-253.

* cited by examiner

DETERMINING A TRAFFIC BEARER FOR DATA TRAFFIC BETWEEN A TERMINAL AND A CONTENT DATA SOURCE OF A CONTENT DATA NETWORK

TECHNICAL FIELD

The invention relates to telecommunication, and, in particular, to methods, a network gateway and a control node for determining a traffic bearer for data traffic between a terminal of a mobile network and a content data source of a content data network, and a computer program.

BACKGROUND

Data traffic in the mobile network is significantly growing, while the end user is expecting services and applications at an affordable price.

Utilization of a content data network is considered to decrease the deployment of mobile network resources and thus reduce transport and peering costs associated with a data traffic and to increase a user experience associated with requested services and applications. Such a content data network comprises a control node and at least one content data source. Data are available from the content data sources, and are, for example, replicated in several content data sources. Such data may be associated with a service usable by a terminal associated with an end user. A content data source is selected by the control node of the content data network upon a request of the terminal for data, in order to provide the requested data to the terminal. Usually, the selected content data source may represent the physically closest entity of the content data sources of the content data network for the terminal. Thus, a data delivery performance in terms of latency times and packet loss may be increased for the end user associated with the terminal.

The content data network is logically located outside of the mobile network, and is linked to respective network gateways of the mobile network via an interface of the mobile network towards the content data network, for example, a SGi interface of a Gi interface.

However, using such a content data network for providing data to a terminal may still require a high load on mobile network resources, and may be accompanied by a poor user experience associated with the data delivery to the end user.

SUMMARY

Therefore, it is an object of the present invention to provide measures enabling a delivery of data between a content data source of a content data network and a terminal, which delivery deploys few mobile network resources and causes a high user experience of an end user associated with the terminal requesting the data from the content data source.

The object defined above is solved by methods, a network gateway, and a control node for determining a traffic bearer for data traffic between a terminal of a mobile network and a content data source of a content data network, and a computer program according to the independent claims.

According to an exemplary aspect of the invention, a method for determining a traffic bearer for data traffic between a terminal of a mobile network and a content data source of a content data network is provided. The method comprises sending a service request for data of the content data source from the terminal to a network gateway of the mobile network, and determining an edge entity of the mobile network. The edge entity is adapted to forward the data traffic between the content data source and the mobile network. The method comprises sending a bearer establishment request to a control node of the mobile network for establishing the traffic bearer to the edge entity, and directing the data traffic associated with the content data source to the traffic bearer.

According to another exemplary aspect of the invention, a method for determining a traffic bearer for data traffic between a terminal of a mobile network and a content data source of a content data network is provided. The method is executed by a network gateway of the mobile network. The method comprises receiving a service request for data of the content data source from the terminal, and sending a bearer establishment request to a control node of the mobile network for establishing the traffic bearer to an edge entity of the mobile network based on the received service request. The edge entity is adapted to forward the data traffic between the content data source and the mobile network.

According to another exemplary aspect of the invention, a method for determining a traffic bearer for data traffic between a terminal of a mobile network and a content data source of a content data network is provided. The method is executed by a control node of the mobile network. The method comprises receiving a bearer establishment request for establishing the traffic bearer to an edge entity of the mobile network. The edge entity is adapted to forward the data traffic between the content data source and the mobile network. The method comprises initiating to direct the data traffic associated with the content data source to the traffic bearer based on the received bearer establishment request.

According to another exemplary aspect of the invention, a network gateway for determining a traffic bearer for data traffic between a terminal of a mobile network and a content data source of a content data network is provided. The network gateway is part of the mobile network. The network gateway comprises a reception unit adapted to receive a service request for data of the content data source from the terminal, and a sending unit adapted to send a bearer establishment request to a control node of the mobile network for establishing the traffic bearer to an edge entity of the mobile network based on the received service request. The edge entity is adapted to forward the data traffic between the content data source and the mobile network.

According to another exemplary aspect of the invention, a control node for determining a traffic bearer for data traffic between a terminal of a mobile network and a content data source of a content data network is provided. The control node is part of the mobile network. The control node comprises a reception unit adapted to receive a bearer establishment request for establishing the traffic bearer to an edge entity of the mobile network. The edge entity is adapted to forward the data traffic between the content data source and the mobile network. The control node comprises an initiating unit adapted to initiate directing the data traffic associated with the content data source to the traffic bearer based on the received bearer establishment request.

According to another exemplary aspect of the invention, a computer program is provided. The computer program, when being executed by a processor, is adapted to carry out or control a method for determining a traffic bearer for data traffic between a terminal of a mobile network and a content data source of a content data network as described above.

Further embodiments of the invention are defined in the dependent claims.

BRIEF DESCRIPTION OF THE DRAWINGS

Embodiments of the invention will be described in more detail hereinafter with reference to examples but to which the scope of the invention is not limited.

DETAILED DESCRIPTION

The illustration in the drawing is schematic. In different drawings, similar or identical elements or steps are provided with the same reference signs or with reference signs which are different from one another in the first digit.

In the following, the methods, the network gateway, the control node and the computer program according to the exemplary aspects will be described in more detail.

Within the context of the present application, the term "traffic bearer" may particularly denote data resources of a mobile network to be used between end points of the traffic bearer for transporting data between the end points.

The term "determining a traffic bearer" may particularly denote an establishment of the traffic bearer and a transmission of data traffic using the established traffic bearer. In particular, the determining of the traffic bearer may comprise the steps of sending a service request, determining an edge entity, sending a bearer request, and directing the data traffic to the traffic bearer.

The term "establishing a traffic bearer" may particularly denote a partial or complete establishment or re-establishment of the traffic bearer between respective end points of the traffic bearer. In particular, the establishment or the re-establishment may comprise a setting or a modification of a data traffic filter to be used by a network entity forming part of the traffic bearer for packing data onto the traffic bearer and/or for directing data transported over the traffic bearer into network resources of the content data network which may be distinct of the data resources of the traffic bearer.

The term "edge entity" of a mobile network may particularly denote a border function between the mobile network and a content data network. In particular, the edge entity may be adapted to direct data traffic between a data transport layer of the mobile network and a data transport layer of the content data network. Here, the data transport layer of the mobile network may comprise the traffic bearer to be determined by the method.

The term "directing the data traffic" may particularly denote transporting data packets of the data traffic via the traffic bearer, packing the data packets on the traffic bearer and/or forwarding data packets from the traffic bearer into the content data network.

According to the exemplary aspects of the invention, a content data source of a content data network, for example a Content Distribution Network or Content Delivery Network (CDN), may be linked with an interface of the mobile network towards the content data network, which interface may connect the edge entity and the content data network with one another. This interface may be, for example, an additional interface of the mobile network with respect to an interface of the network gateway, for example the SGi/Gi interface, and may represent a logically internal interface of the mobile network with respect to the network gateway. The kind of the interface may be similar to the SGiGi interface of the mobile network or may be configured as a new type of interface. Further, the content data source may be physically located close to the terminal, for example closer than the network gateway or it may be connected to the mobile network using a fast communication link.

A traffic bearer to be used between the terminal and the content data source for transporting data between the terminal and the content data source may be established in the above described communication network between the terminal and the edge entity of the mobile network. Data packets of the data traffic associated with the content data source may thus be directed to the traffic bearer, i.e. the bearer transports these data packets, e.g. by mapping or identifying the packets by a filter. Here, the edge entity may be physically located close to the terminal, for example closer to the network gateway.

Therefore, the mobile network may provide a further interface for data exchange with the content data network such that use of network resources of the mobile network associated with the delivery of the data traffic between the terminal and the content data source may be reduced. Further, the user experience of an end user associated with the terminal receiving the data traffic from the content data source may be significantly increased, since the content data source may be logically linked with the logically internal interface of the mobile network, and, in addition, the edge entity of the mobile network which may be closer to the user. In particular, latency times during the delivery of the data traffic may be low, and packet losses during the delivery of the data traffic may be prevented or reduced owing to the utilization of the edge entity.

Next, further exemplary embodiments of the method will be explained. However, these embodiments also apply to the other methods executed by the network gateway and the control node, the network gateway, the control node, and the computer program.

In particular, the data may comprise content, for example an excerpt of a book, or a service or application, for example a video stream.

In particular, the established traffic bearer may exclude the network gateway, i.e. the edge entity may be different from the network gateway. The traffic bearer may only run between the terminal and the edge entity and may include those network entities on a data path of the data traffic between the latter two entities. Therefore, a routing path of the data traffic in the mobile network may be short particularly in comparison to a traffic bearer including the network gateway. In the latter regard, the method may enable an optimization of the traffic bearer to be established or already existing. Further, utilization of resources of the mobile network during the delivery of the data traffic via the short or shortcut traffic bearer may be reduced particularly in comparison to a traffic bearer including the network gateway.

In particular, the edge entity may be configured as an anchor point for the data traffic of the terminal in case of mobility related modifications of the data traffic, i.e. modifications resulting from the terminal moving within the mobile network. Therefore service continuation associated with the delivery of the data traffic may be ensured for the terminal when the terminal may perform a handover.

In particular, the step of determining the edge entity may comprise determining an identity of the edge entity, for example an IP based address or a name. The identity of the edge entity may indicate a location of the edge entity in the mobile network, and vice versa.

The method may further comprise selecting, by a control node of the content data network, the content data source based on a request of the terminal, and sending an identity of the content data source to at least one of the terminal and the network gateway. The identity of the content data source may comprise or may be configured as an address, particularly an Internet Protocol (IP) based address, or a name of the content data source. Therefore, the mobile network may be informed about the selection of the content data source which may be performed logically outside of the mobile network, i.e. externally of the mobile network, by the content data network, in order to provide the mobile network with sufficient information to be capable of determining the edge entity within the mobile network, i.e. internally in the mobile network.

In particular, in a case in which the identity of the content data source may be sent to both the terminal and the network gateway, a message may be sent from the control node of the content data network to the terminal and the network gateway, and the network gateway may intercept this message and may forward the message after message inspection for the identity of the content data source. Alternatively or additionally, a message may be sent from the control node of the content data network to the terminal and a separate message may be sent from the control node of the content data network to the network gateway.

In particular, in a case in which the identity of the content data source may be sent from the control node of the content data network to the network gateway, the network may be explicitly informed by the control node such that the network gateway might not have to perform message inspection of an intercepted message.

The service request may indicate, particularly the identity of, the content data source, and the step of determining the edge entity may be therefore accurately executed. In particular, the service request might not indicate the identity of the content data source in a case in which the identity of the content data source may be sent from the control node of the content data network to the network gateway.

The method may further comprise determining, by the network gateway, whether to establish the traffic bearer based on the received service request and/or the identity of the content data source received from the control node of the content data network, and the step of sending the bearer establishment request may be executed based on a result of the step of determining. In particular, the bearer establishment request may be sent, if the step of the determining may be in the affirmative, and, on the contrary, the step of sending the bearer establishment request may be omitted, if the step of determining is not in the affirmative. For example, the network gateway may determine whether the content data source may be logically connected to the internal interface of the mobile network and/or may be physically located within the mobile network based on the identity of the content data source. Therefore, an unnecessary establishment procedure for a traffic bearer, for example if the content data source may be not linked with the internal interface of the mobile network may be avoided, thereby contributing to the saving the resources of the mobile network and increasing the user experience of the end user.

The bearer establishment request may establish or modify a, particularly downlink and/or uplink, data traffic filter for directing the data traffic to the traffic bearer. Here, the term "uplink" transmission direction may particularly denote a transmission direction from the terminal to the content data source, and the term "downlink" transmission direction may particularly denote a transmission direction from the content data source to the terminal. For example, the bearer establishment request may comprise a specification of an uplink and/or downlink data traffic filter to be used by the edge entity for establishing the data traffic filter or modifying a data traffic filter already available in the edge entity. Thus, the determination of the traffic bearer may comprise a setting of the data traffic filter in the edge entity such that an uplink data traffic may be identified and routed from the traffic bearer into the content data network and a downlink data traffic may be packed from the content data network to the traffic bearer.

In particular, the specification of the uplink and/or downlink data traffic filter may be defined by the network gateway particularly based on information about the source of the service request, namely the terminal, and the destination of the service request, namely the content data source.

In particular, the terminal may use an uplink data traffic filter for directing particular data packets of the data traffic to the traffic bearer. This uplink data traffic filter of the terminal may be used in addition to or without the uplink data traffic filter established or modified in the edge entity for the directing of the data traffic. The uplink data traffic filter may be already available in the terminal, and may be, for example, preconfigured.

The step of determining may comprise determining a location of the edge entity in the mobile network, particularly based on an identity of the content data source indicated in the service request and/or received from the control node of the content data network. Therefore, a selection of the edge entity representing the interface of the mobile network towards the content data network may be enabled, and the traffic bearer may be thus determined in a dynamical and flexible way.

In particular, the step of determining the edge entity may be executed by the control node or by the network gateway based on the identity of the content data source. In the first option, the network gateway may send the bearer establishment request indicating the identity of the content data source to the control node. In the second option, the bearer establishment request may indicate the identity of the edge entity, for example by a, particularly IP based, address or name of the edge entity, such that the control node may be accordingly informed of the edge entity associated with the traffic bearer. Therefore, two separate, efficient mechanisms may be provided for determining the edge entity based on information available in the mobile network and being unknown to the terminal and the content data network.

In particular, the step of determining the edge entity may be executed based on the kind of the requested data, thereby increasing an accuracy of the step of determining. The service request and/or the bearer establishment request may indicate the requested data.

The method may further comprise determining, particularly by the control node, whether the traffic bearer may exist between the terminal and the edge entity, and requesting, particularly by the control node, the terminal to initiate an establishment of the traffic bearer, if the traffic bearer does not exist. For example, the step of determining may comprise or may be combined with a step of determining, particularly by the control node, whether a packet data connection exists between the terminal and the edge entity, and the step of requesting may comprise or may be combined with a step of requesting, particularly by the control node, the terminal to initiate an establishment of the packet data connection, if the packet data connection does not exist. Here, the packet data connection may comprise or may be configured as a Packet Data Network (PDN) connection. Therefore the determination of the traffic bearer may be efficiently executed by the mobile network, since a further negotiation with the terminal regarding an existence of the traffic bearer or a packet data connection may be avoided.

The step of determining may comprise a selection procedure by the control node in response to receiving the bearer establishment request. Since the control node may be usually the network entity comprising relevant information about various edge entities in the mobile network, the method may be easily implemented in already existing architectures of the mobile network, for example by enhancing the control node with the information about the edge entities associated with the content data network.

The edge entity may be a further network gateway of the mobile network. For example, the edge entity may be a Local Gateway or Local PDN Gateway (L-GW) or a Local General Packet Radio Service (GPRS) Support Node (L-GGSN). In particular, the edge entity may be an independent network entity, i.e. a stand-alone network entity, of the mobile network. Here, the term "stand-alone" network entity may particularly denote a network entity which may comprise physical resources being not shared with a further network entity. Logical resources of the stand-alone network entity may be also separated from logical resources of the further network entity. Particularly in the case of the L-GW and the L-GGSN, already available network entities may be employed for forming the border function of the mobile network towards the content data network.

The step of determining may comprise a selection procedure by the network gateway in response to receiving the service request. Therefore, a very efficient mechanism for the determination of the edge entity associated with the traffic bearer may be provided in that the information about the identity of the content data source does not have to be sent from the network gateway to the control node, thereby saving network and processing resources associated with the sending of the latter information.

The control node may be the edge entity, and the content data source may be co-located with the edge entity, in particular if the control node may be part of the traffic bearer. The term "co-located" network entity may particularly denote a network entity which may share physical resources with a further network entity, but whose logical resources may be separated from logical resources of the further network entity. In particular, the control node may be the end point of the traffic bearer to be used for transporting the data traffic. For example, the traffic bearer may run between the terminal and the edge entity. Alternatively, an already existing traffic bearer may be established through the control node, and the data traffic transported on the existing, established traffic bearer may be broken out at the edge entity towards the content data network, i.e. the data traffic may be directed from the traffic bearer to the content data network. Hence, the existing, established traffic bearer may be modified in that a new traffic bearer associated with the data traffic to and from the content data source may be created. This measure may also represent a simple option of implementing the method in an already existing architecture of the mobile network.

In particular, in the latter described case, the bearer establishment request may establish or modify the downlink and uplink data traffic filters, and the terminal may use the uplink data traffic filter for directing the data traffic onto the traffic bearer. Therefore, in a case in which further data traffic distinct from the data traffic associated with the content data source may be transported over the traffic bearer, the edge entity may be enabled to identity the data traffic to be forwarded into the content data network. Therefore, a conventional control node may be modified to a necessary extent by the mobile network itself, thereby facilitating the implementation of the method in a conventional communication network architecture.

The method may further comprise determining, by a further control node of the mobile network on a signaling path of the bearer establishment request, whether a further bearer establishment request may have to be sent by the further control node, and executing the bearer establishment request if the further bearer establishment request might have not to be sent and else sending the further bearer establishment request by the further control node. In particular, the bearer establishment request and the further bearer establishment request may be distinct from one another. Further, the further bearer establishment request may be sent along the signaling path towards the control node in a signaling upstream direction, i.e. from the radio access network to the network gateway, or in a signaling downstream direction, i.e. from the network gateway to the radio access network. Thus, in a case in which the further control node may receive the bearer establishment request, it may be ensured that the control node may still be informed about the sent bearer establishment request.

In particular, information included in the bearer establishment request and the further bearer establishment request may be similar with respect to the identity of the content data source and/or the edge entity and/or the data traffic filter.

In particular, the further control node may determine whether the further control node may be a breakout point for the data traffic and/or may be a final recipient of the bearer establishment request, respectively, and may execute the bearer establishment request, if the further control node may be the breakout point and/or may be final recipient, respectively, and may else send the further bearer establishment request. Here, the edge entity may be indicated in the bearer establishment request by its identity.

In the following, exemplary embodiments of the network gateway will be described. However, these embodiments also apply to the methods, the control node and the computer program.

In particular, the network gateway may be adapted to, particularly automatically, execute one or more steps of the above described methods.

In particular, the network gateway may be configured as a PDN Gateway (P-GW) or a GPRS Support Node (GGSN) of a packet switched core network of the mobile network.

In the following, exemplary embodiments of the control node will be described. However, these embodiments also apply to the methods, the network gateway and the computer program.

In particular, the control node may be adapted to, particularly automatically, execute one or more steps of the above described methods.

In particular, the control node may be adapted to control data traffic between the terminal and the content data source in the mobile network. The control node may be thus part of a control plane in the mobile network.

In particular, the control node may be part of a radio access network or a core network of the mobile network. For example, the control node may be an eNodeB of a Long Term Evolution (LTE) radio access network, a Radio Network Controller (RNC) or a NodeB of an Universal Mobile Telecommunications System (UMTS) Terrestrial Radio Access Network (UTRAN), or a Base Station Controller (BSC), a Base Transceiver Station (BTS) or a Base Station (BS) of a Global System for Mobile Communications (GSM) Enhanced Data Rates for GSM Evolution (EDGE) Radio Access Network (GERAN). Further, the control node may be a Mobile Management Entity (MME) or a GPRS Support Node (SSGN).

In particular, if the content data source may be co-located with the edge entity, the control node may be part of the data path of the data traffic transported via the traffic bearer. In this case, the control node might be not configured as a MME.

Figure 1:
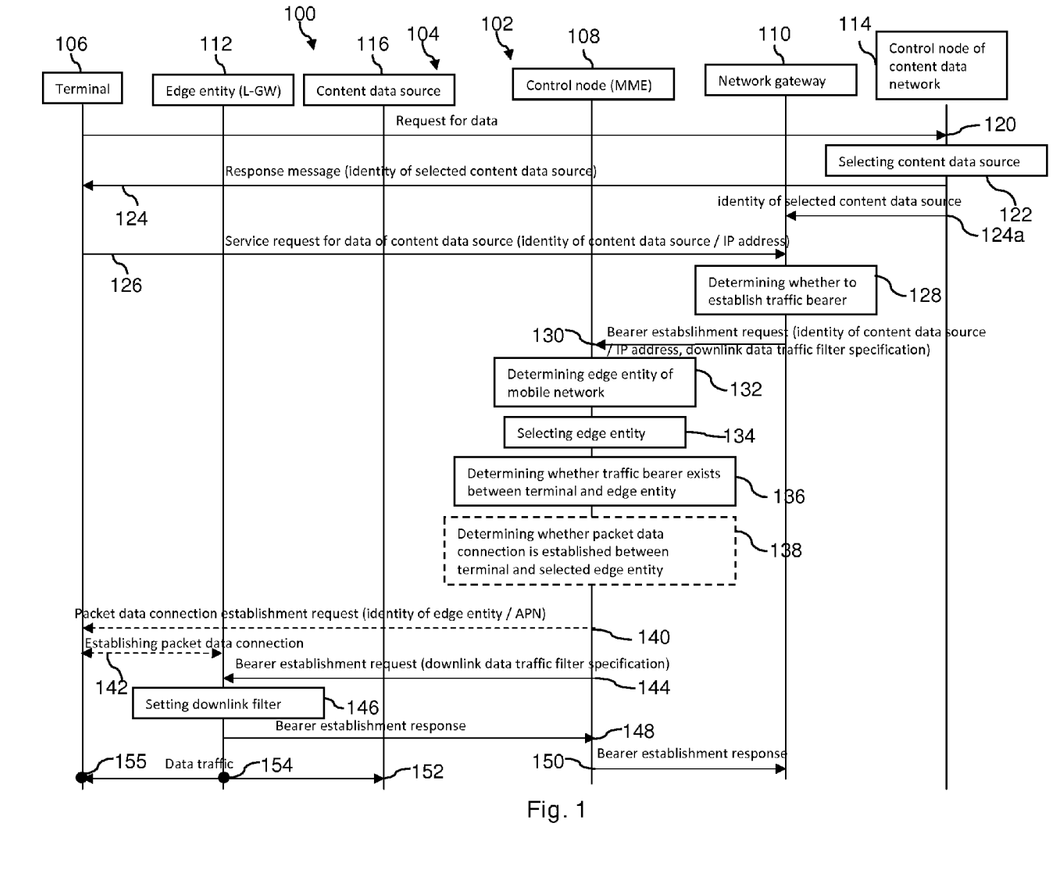
FIGS. 1, 2 are flow diagrams illustrating a method for determining a traffic bearer for data traffic between a terminal of a mobile network and a content data source of a content data network according to first and second exemplary embodiments.

Referring to FIG. 1, a method for determining a traffic bearer for data traffic between a terminal of mobile network and a content data source of a content data network according to a first exemplary embodiment will be explained. The communication network 100 associated with the method comprises a mobile network 102 and a packet data network 104. A terminal 106 is located in the mobile network 102 and is connected to a core network of the mobile network 102 via a radio access network of the mobile network 104, for example a LTE radio access network.

The mobile network 102 comprises a control node 108, for example, a MME, and a network gateway 110, for example a P-GW. The network gateway 110 represents an edge entity between the mobile network 102 and the content data network 104. The mobile network 102 comprises a further edge entity 112, for example a L-GW which also represents a border function of the mobile network 102 associated with an internal interface within the mobile network 102 towards the content data network 104 with respect to the network gateway 110.

The content data network 104 comprises a control node 114, and several content data sources. A content data source 116 of the content data sources of the content data network 104 is physically located closely to the edge entity 112, and is logically located within the mobile network 102 with respect to the network gateway 110.

In order to retrieve data stored in the content data source 116, the terminal 106 initiates the method for determining a traffic bearer according to the first exemplary embodiment.

In a first step 120 of the method, the terminal 106 sends a request for data, for example a video stream, to the control node 114 of the content data network 104 via the network gateway 110 of the mobile network 102. In a step 122, the control node 114 selects a content data source based on the received request from the terminal 106. To this end, the control node 114 determines which content data source stores the requested data, and accordingly identifies the content data source 116. In a next step 124, the control node 114 sends a response message to the terminal 106 via the network gateway 110 of the mobile network 102. The response message indicates an identity of the selected content data source 116. For example, a respective indication of the response message is adapted as an IP address of the content data source 116. In a step 124a, the control node 114 sends the identity, the IP address, of the content data source 116 to the network gateway 110. This step 124a may be omitted, and the network gateway 110 may intercept the response message in the step 124 to extract the identity of the content data source 116.

In a next step 126, the terminal 106 sends a service request for the data to the content data source 116 based on the received response message. The service request indicates the identity of the content data source 116, e.g. as part of an IP packet header. In a step 128, the network gateway 110 determines whether to establish a traffic bearer between the terminal 106 and the content data source 116 based on the received service request and/or based on the message received in the step 124a. Here, the network gateway 110 associates the identity of the content data source 116 indicated in the service request message and/or in the message received in the step 124a with a logical location of the content data source 116 within the mobile network 102. The network gateway 116 identifies the IP address of the content data source 116 to be an address in the mobile network 102. Thus, the determination of the step 128 is in the affirmative, and the network gateway 110 sends in a step 130 a bearer establishment request to the control node 108, in order to initiate the establishment of the traffic bearer between the terminal 106 and the content data source 116. The bearer establishment request indicates the identity of the content data source 116, i.e. its IP address, and may comprise a specification of a downlink data traffic filter, which filter, upon being set in the edge entity 112, is adapted to direct the data traffic in a downlink transmission direction, i.e. in a direction from the content data source 116 to the terminal 106, to the traffic bearer to be established.

In a next step 132, the control node 108 determines an edge entity of the mobile network 102 which edge entity is adapted to forward the data traffic between the content data source 116 and the mobile network 102. The determination of the step 132 results in an identification of the edge entity 112. Further, as a part of the step 132, a location of the edge entity 112 in the mobile network 104 is determined, for example, by identifying the identity of the edge entity 112 in terms of its IP address. The control node 108 selects in a step 134 the edge entity 112.

In a next step 136, the control node 108 determines whether a traffic bearer exists between the terminal 106 and the edge entity 112. Assuming this determination to be not in the affirmative, the control node 108 thereupon determines in a step 138 whether a packet data connection is established between the terminal 106 and the edge entity 112. Assuming this determination to be also not in the affirmative, the control node 108 sends a packet data connection establishment request to the terminal 106, in order to request from the terminal 106 to initiate an establishment of the packet data connection between the terminal 106 and the edge entity 112. The establishment request indicates the identity of the edge entity 112, for example, by an included APN assigned by the control node 108 to the edge entity 112. Next, in a step 142, the terminal 106 initiates an establishment procedure of the packet data connection between the terminal 106 and the edge entity 112, which procedure is also successfully completed in the step 142. Thereupon, the control node 108 sends in a step 144 a bearer establishment request to the edge entity 112, in order to request the terminal 106 to initiate the establishment of the traffic bearer to the edge entity 112. The bearer establishment request comprises the specification of the downlink data traffic filter. In a step 146, the edge entity 116 sets the downlink data traffic filter based on the received specification. Thereupon, the edge entity 112 sends in a step 148 a bearer establishment response to the control node 108, which, in turn, sends a bearer establishment response in a step 150 to the network gateway 110. Thus, the establishment procedure of the traffic bearer between the terminal and the edge entity 112 is completed, and the established traffic bearer excludes the control node 108 and the network gateway 110.

In a step 152, upon request of the terminal 106, the data traffic is sent between the content data source 116 and the terminal 106 via the edge entity 112. As indicated by a circle 154, the edge entity 112 directs the data traffic from the content data source 116 to the traffic bearer established between the terminal 106 and the edge entity 112. As indicated by a circle 155, the terminal 106 uses an uplink data traffic filter available in the terminal 106 to direct the data traffic in the uplink direction, i.e. in a direction from the terminal 106 to the content data source 116, to the traffic bearer.

If the determination of the step 128 is not in the affirmative or the determination of the step 132 results in null information, the method will stop. Assuming the determination of the steps 136, 138 to be in the affirmative, the method will proceed with the step 144.

Figure 2:
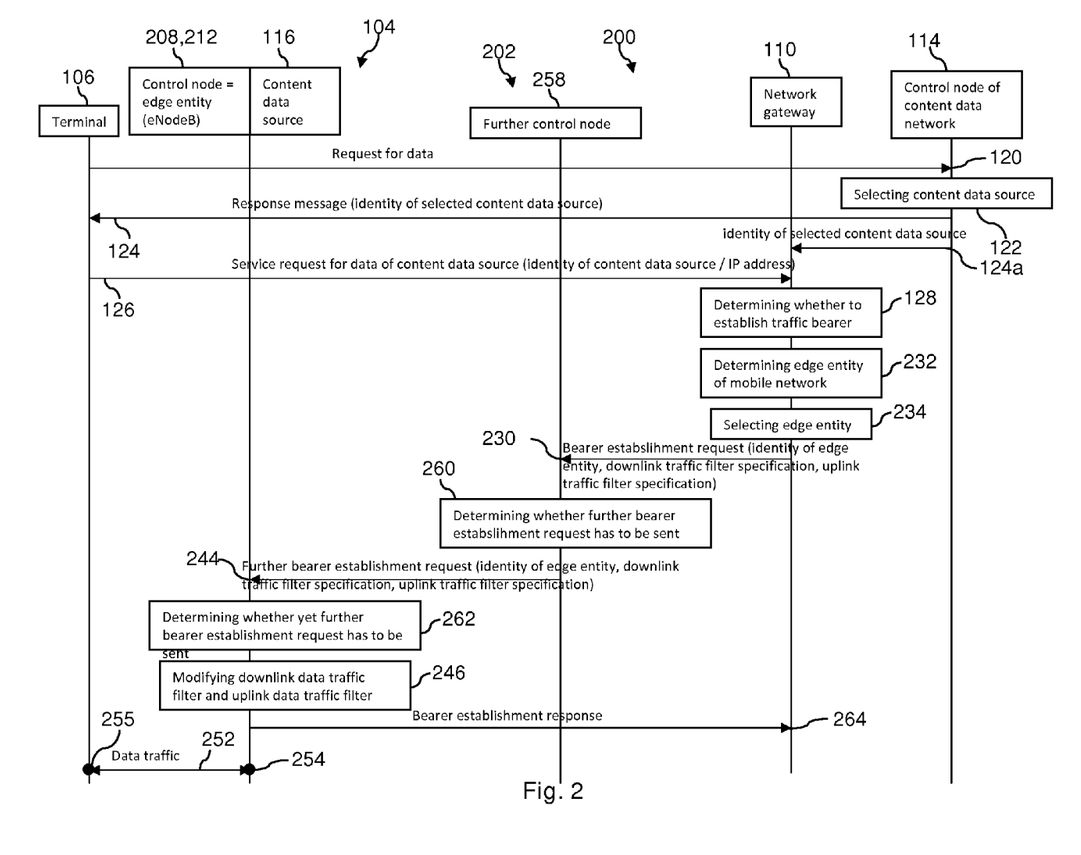

Referring to FIG. 2, a method for determining a traffic bearer for data traffic between a terminal of a mobile network and a content data source of a content data network according to a second exemplary embodiment will be explained. The communication network 200 associated with the method is similar to the communication network 100 of FIG. 1. However, a control node 208 of the mobile network 202, for example an eNodeB of a LTE radio access network of the mobile network 202, represents an edge entity 212 of the mobile network 202.

The edge entity 212, i.e. the control node 208, is adapted to forward data traffic between the content data source 116 and the mobile network 202. For simplicity, the control node 208 and the edge entity 212 will be referred in the following using the reference numeral 208. Further, the content data source 116 is co-located with the control node 208. The mobile network 202 further comprises a further control node 258, for example a S-GW, which is adapted to control data traffic in the mobile network 202.

It is assumed in the following that a traffic bearer exists between the terminal 106 and the control node 208.

First, steps 120-128 illustrated in FIG. 1 are executed. The network gateway 110 determines then in a next step 232 an edge entity of the mobile network 202 based on an identity of the content data source 116, i.e. an IP address, indicated in a service request received in a step 124 and/or in a message sent in a step 124a, which edge entity is adapted to forward the data traffic between the content data source 116 and the mobile network 202. To this end, the network gateway 116 determines as a sub-step of the step 232 a location of an edge entity associated with the content data source 116 based on the received identity of the content data source 116. This determination results in the identification of the edge entity 208 which is co-located with the content data source 116. Thereupon, in a step 234, the network gateway 110 selects the determined edge entity 208, i.e. the control node 208, and sends in a step 230 a bearer establishment request to the control node 208. The bearer establishment request indicates the determined control node 208 to be the edge entity 208 and the a final recipient of the bearer establishment request and comprises a specification of a downlink data traffic filter and a specification of an uplink traffic filter to be used by the control node 208 for directing the data traffic associated with the content data source 116 to and from the traffic bearer to be established, respectively.

The further control node 258 on the signaling path of the bearer establishment request receives the bearer establishment request, and determines in a step 260 whether a further establishment request has to be sent by the further control node 258. To this end, the further control node 258 determines whether the further control node 258 is the edge entity 208 of the traffic bearer to be established. Since the control node 208 is indicated in the received message to be the edge entity 208, the determination of the step 260 is not in the affirmative, and the further control node 258 sends in a step 244a further bearer establishment request to the control node 208. The further bearer establishment request indicates the determined control node 208 to be the edge entity 208 and the final recipient of the this further bearer establishment request, and comprises the specifications.

In a step 262, at reception of the bearer establishment request, the control node 208 determines whether the control node 208 is the edge entity 212 of the traffic bearer to be established. As the determination is in the affirmative, the control node 208 modifies a downlink data traffic filter and an uplink data traffic filter available in the edge entity 208 based on the specification of the downlink traffic filter and the specification of the uplink data traffic filter, respectively. Next, in a step 264, the control node 208 sends a bearer establishment response to the network gateway 110 indicating the successful bearer establishment between the terminal 106 and the control node 208. The established traffic bearer runs between the terminal 106 and the control node 208, and excludes the further control node 258 and the network gateway 110.

Next, in a step 252 data traffic between the content data source 116 and the terminal 106 is exchanged. The control node 208 uses, as indicated by a circle 254, the downlink data traffic filter and the uplink data traffic filter modified in the step 246 for directing the data traffic from the content data source 116 to the traffic bearer and vice versa. The terminal 106 uses, as indicated by a circle 255, an already set uplink data traffic filter for directing the data traffic to the established traffic bearer.

If the determination of the step 128 is not in the affirmative or the determination of the step 232 results in null information, the method will stop.

Figure 3:
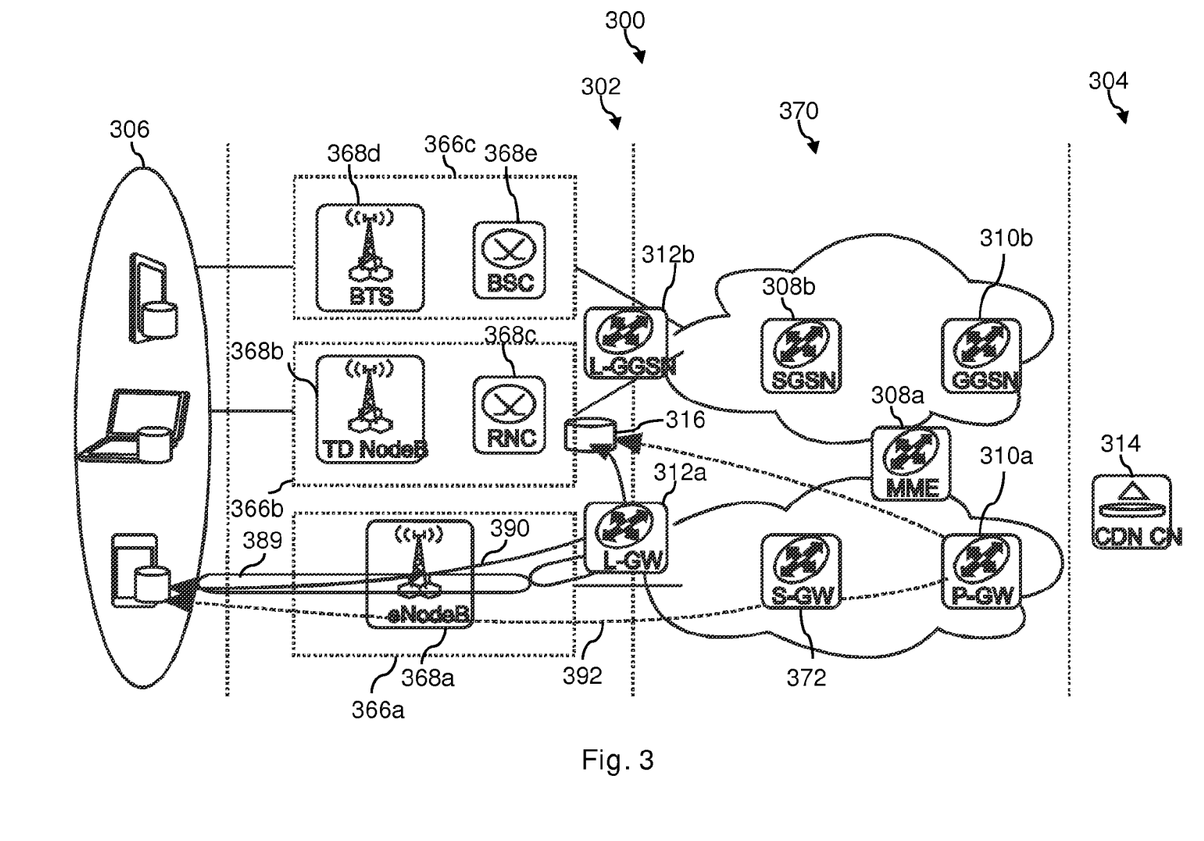
FIG. 3 is a block diagram illustrating a communication network associated with a method for determining a traffic bearer for data traffic between a terminal of a mobile network and a content data source of a content data network according to a third exemplary embodiment.

Referring to FIG. 3, a method for determining a traffic bearer for data traffic between a terminal and a content data source of a content data network according to a third exemplary embodiment will be explained. A communication network 300 associated with the method is similar to the communication network 100 illustrated in FIG. 1. A mobile network 302 of the communication network 300 comprises three radio access networks 366a-c which are configured as a LTE radio access network, a Time Division Synchronous Code Division Multiple Access (TD-SCDMA) radio access network and a GSM radio access network, respectively. A control node 368a of the LTE radio access network 366a is an eNodeB. Control nodes 368b, c of the TD-SCDMA radio access network 366b are a Time Division (TD) NodeB and a RNC. Control nodes 368d, e of the GSM radio access network 366c are a BTS and a BSC. A core network 370 of the mobile network 302 comprises a control node 308a, a MME, associated with the LTE radio access network 366a and a control node 308b, a SGSN, associated with the TD-SCDMA and GSM radio access networks 366b, c. Network gateways 310a, b of the core network 370 are a P-GW associated with the LTE radio access network 366a and a GGSN associated with the TD-SCDMA and GSM radio access networks 366b, c, respectively. A further control node 372 of the core network 370 is a Signaling Gateway (S-GW). An edge entity 312a interfacing the LTE radio access network 366a and the core network 370 is configured as a L-GW 312a. A further edge entity 312b interfaces the TD-SCDMA and GSM radio access networks 366b, c and the core network 370, and is a L-GGSN. A terminal 306 can be configured, for example, as a smart phone, a laptop or a cellular phone.

Figure 4:
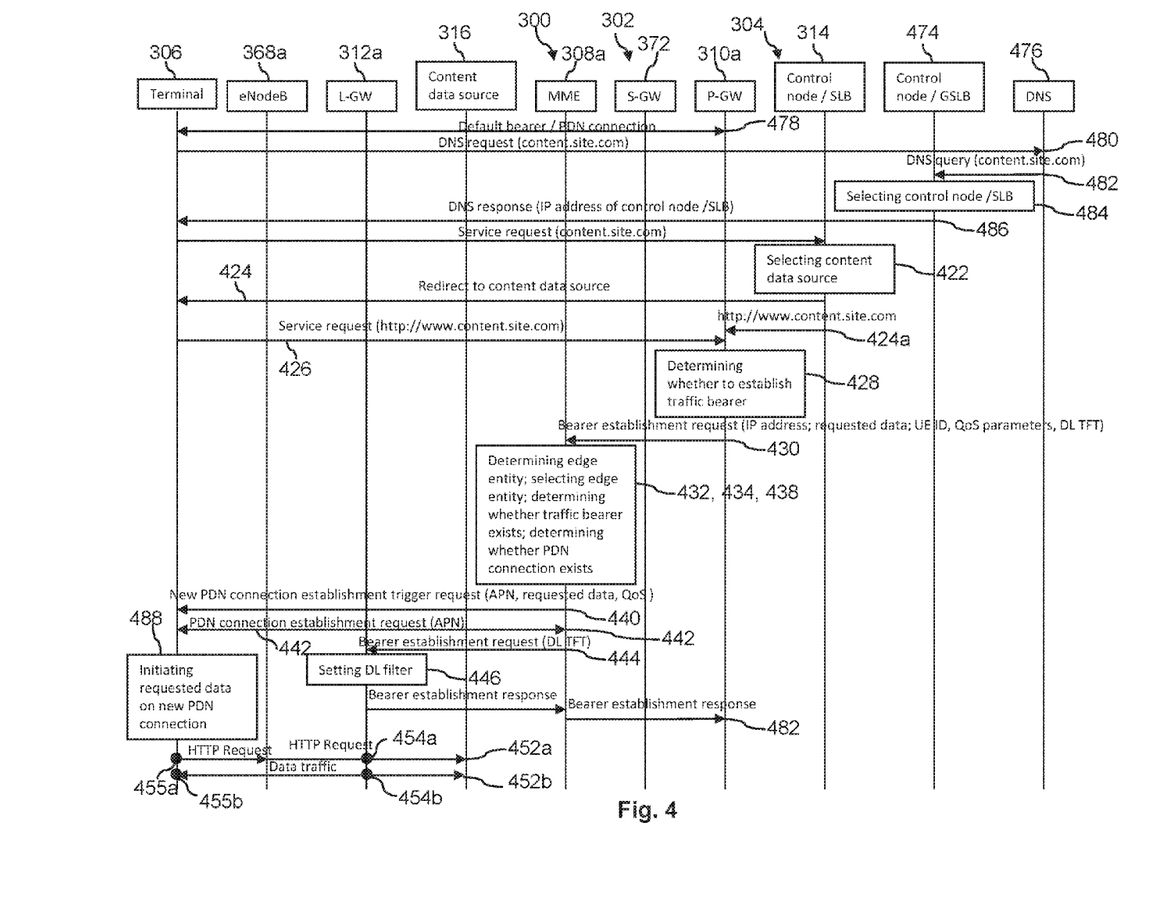
FIG. 4 is a flow diagram illustrating the method according to the third exemplary embodiment associated with the communication network in FIG. 3.

As illustrated in FIG. 4, the content data network 304 is configured as a Content Distribution Network (CDN), and comprises, besides a control node 314, a further control node 474 and a Directory Name Service (DNS) node. The control node 314 comprises a Server Load Balancing (SLB) functionality and the further control node 474 comprises a Global Server Load Balancing (GSLB) functionality.

As indicated in a first step 478 of the method, a default Evolved Packet System (EPS) traffic bearer and an associated PDN connection is established between the terminal 306 and the P-GW 310a. In a step 480, the terminal 306 sends a DNS request indicating requested data, for example an audio content, to the DNS 476, which in turn, in a step 482, sends the DNS request to the further control node 474. In both messages, the requested data are indicated by an IP address, namely "content.side.com". The further control node 474 determines in a step 484 a control node of the content data network 304 associated with the requested data and accordingly selects the control node 314. In a next step 486, the gateway 374 sends a DNS response message to the terminal 306 indicating the identity of the control node 314 by an included IP address assigned to the control node 314. Thereupon, the terminal 306 sends a service request in a step 420 to the control node 314, which message indicates the requested data. In a step 422, the control node 314 selects the content data source 316 based on an indication of the requested data, and sends an identity of the content data source 316 in a step 424 to the terminal 306, in order to redirect the service request from the terminal 306 to the content data source 316. Further, in a step 424a, the control node 314 sends the identity of the content data source 316 to the P-GW 310a. The identity may be indicated as an IP address in the form of a webpage address, for example, http:www.content.side.com. This step 424a may be omitted, and the network gateway 310a may intercept the response message in the step 424 to extract the identity of the content data source 316.

In a step 426, the terminal 306 sends a service request to the content data source 316, which is intercepted by the P-GW 310a. The service request is based on a Hypertext Transfer Protocol (HTTP), and indicates the identity of the content data source 316 in the form of the webpage address, for example, http:www.content.side.com. In a next step 428, the P-GW 310a determines whether to establish the traffic bearer between the terminal 306 and the content data source 316 based on the received service request and/or the message received in the step 424a. In the step 428, the P-GW 310a evaluates the IP address indicated in the service request message and/or the message received in the step 424a and detects that the IP address of the content data source 316 belongs to the mobile network 302 from IP subnet information available in the P-GW 310a. Thus, as the determination is in the affirmative, the P-GW 310a initiates the bearer establishment procedure, and accordingly sends in a step 430 a bearer establishment request to the MME 308a. The bearer establishment request comprises the identity of the content data source 316, namely its IP address, an identity UE ID of the terminal, the requested service, Quality of Service (QoS) parameters authorized for the terminal 306, and a specification of a downlink data traffic filter, for example a Downlink Traffic Flow Template (DL TFT).

Thereupon, the MME 308a determines in a step 432 an edge entity of the mobile network 302, which edge entity is adapted to forward the data traffic between the content data source 316 and the mobile network 302. The MME 308a identifies the L-GW 312a based on the IP address of the content data source 316 and the requested service indicated in the bearer establishment request in that the MME 308a determines that the content data source 316 is logically connected to an internal interface of the mobile network 402 towards the content data network 304 and the L-GW 312a represents a border function between the mobile network 302 and the content data network 304 within the mobile network 302 and is associated with the MME 308a with respect to the communication network architecture. Accordingly, the MME 308a selects in a step 434 the L-GW 312a as the edge entity serving the serving request of the terminal 306.

Further, in a step 438, the MME 308a determines whether the traffic bearer exists between the terminal 306 and the edge entity 312a. This determination is not in the affirmative. The MME 308 then determines whether a PDN connection exists between the terminal 306 and the L-GW 312a. Assuming this determination to be not in the affirmative, the MME 308a accordingly determines that a new PDN connection between the terminal 306 and the L-GW 312a is required. The MME 308a determines an APN based on the information received by the bearer establishment message based on a preconfigured association between the APN and the L-GW 312a. The MME 308a then requests in a step 440 from the terminal 306 to establish a new PDN connection between the terminal 306 and the L-GW 312a by sending a respective NAS request message over the established PDN connection. The NAS message comprises the APN, information about the requested service, and the QoS parameters. In a next step 442, the terminal 306 initiates a PDN connection establishment procedure with the L-GW 312a and the MME 308a. Subsequent to a successful establishment of the PDN connection, the MME 308a sends in a step 444 a bearer establishment request to the L-GW 312a comprising the specification of the DL TFT. In turn, the L-GW 312a sets or installs in a step 446 the DL TFT for directing the data traffic from the content data source 316 to the traffic bearer to be established. Thereupon, in a step 448, the L-GW 312a sends a bearer establishment response to the MME 308a, which in turn sends a bearer establishment response in a step 450 to the P-GW 310a. A radio traffic bearer is established between the terminal 306 and L-GW 312a.

Meanwhile, the terminal 306 initiates in a step 488 the requested service via the newly established PDN connection by enforcing an uplink data traffic filter, an UL TFT, and sends in a step 452a a HTTP request for the data to the content data source 316 via the eNodeB 368a. Thereupon, in a step 452b, the terminal 306 communicates with the content data source 316, in order to retrieve the requested data. As indicated by circles 454a, b the L-GW 312a directs the data traffic from the traffic bearer to the content data source 316, i.e. to the transport layer of the content data network 304, and from the content data source 316 to the traffic bearer established between the terminal 306 and the L-GW 312a by mapping the downlink data traffic to the DL TFT. As indicated by a circle 455a, b, the terminal 306 uses an UL TFT available in the terminal 306 for identifying the uplink data traffic from the terminal to the content data source 316, in order to direct the data traffic in terms of packing the data packets of the data traffic on the established traffic bearer.

If the determination in the steps 428 is not in the affirmative or the determination in the step 432 results in null information, the method will stop. In a case in which the determination of the steps 436, 438 are in the affirmative, the method proceeds with the step 444.

Again referring to FIG. 3, the established traffic bearer, referenced by the reference numeral 389, is established between the terminal 306 and the L-GW 312a and includes the eNodeB 368a, but excludes the P-GW 310a and further control nodes of the core network 370, since these further control nodes are not part of a data path of the traffic bearer. The data traffic exchanged between the terminal 306 and the content data source 316 runs along a routing path 390 comprising the traffic bearer path and a routing path between the L-GW 312a and the content data source 316. For comparison, a routing path 392 of the data traffic exchanged between the terminal 306 and the content data source 316 using conventional procedures runs between the terminal 306 and the content data source 316 via the P-GW 310a, and the S-GW 372. A traffic bearer associated with the routing path 392 accordingly includes the latter mentioned entities, i.e. the terminal 306, the eNodeB 368a, the S-GE 372, and the P-GW 310a.

It is noted that in a case in which the terminal 306 attaches to the mobile network 302 via the TD-SCDMA or GSM radio access networks 360b, c, the network gateway is the GGSN 310b, the control node is the SGSN 308b, and a selected edge entity is the L-GGSN 312b.

Figure 5:
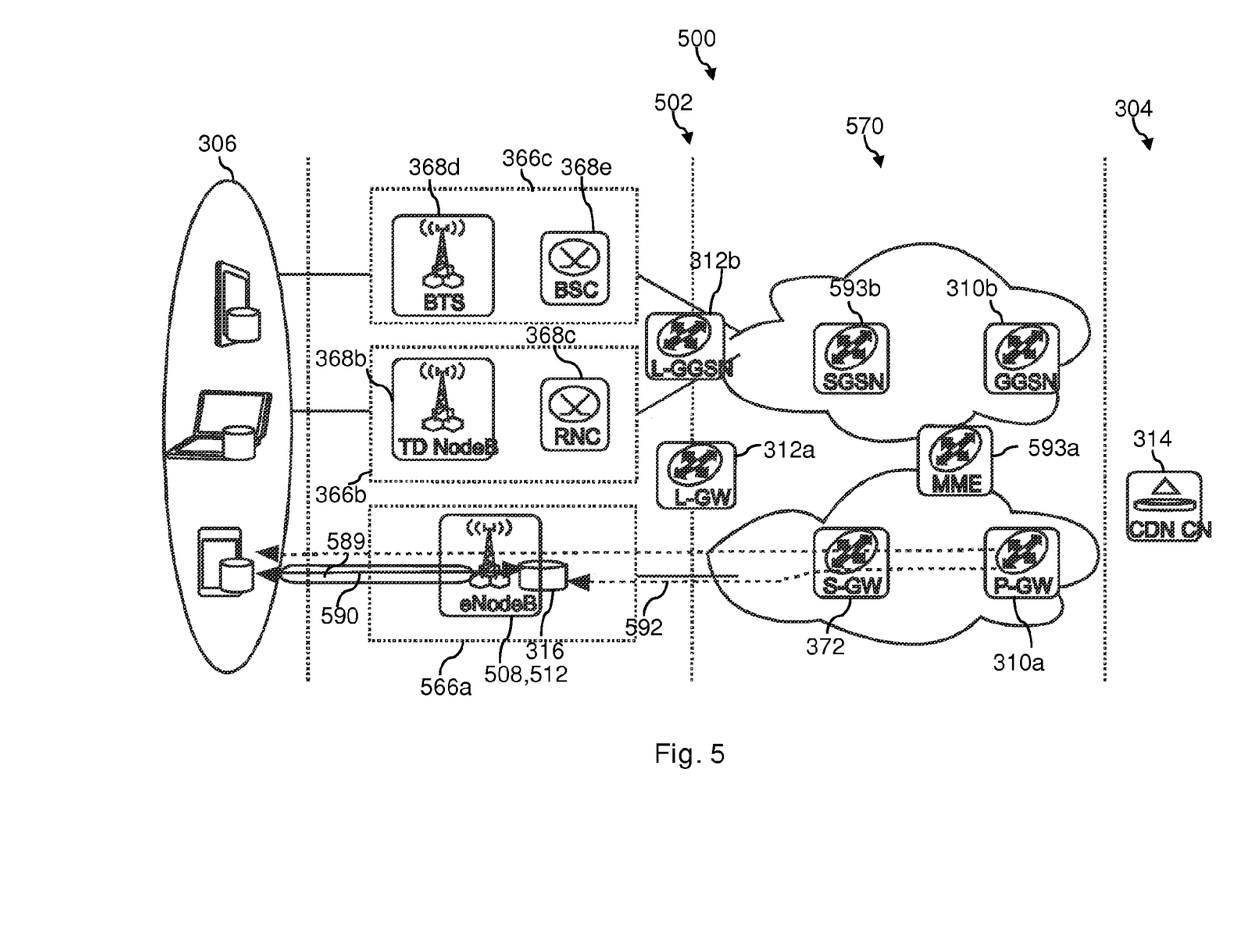
FIG. 5 is a block diagram illustrating a communication network associated with a method for determining a traffic bearer for data traffic between a terminal of a mobile network and a content data source of a content data network according to a fourth exemplary embodiment.

Referring to FIG. 5, a communication network 500 associated with a method for determining a traffic bearer for data traffic between a terminal of a mobile network and a content data source of a content data network according to a fourth exemplary embodiment will be explained. The communication network 500 is similar to the communication network 300. However, the content data source 316 is co-located with a control node 508 adapted to control data traffic of the terminal 306 in the mobile network 502. The control node 508 is configured as an eNodeB of the LTE radio access network 566a. Accordingly, the control node 508 represents an edge entity 512 between the mobile network 502 and the content data network 304, which edge entity 512 is adapted to forward data traffic between the content data source 316 and the mobile network 502. Control nodes of the core network 570 are a MME 593a, and a SGSN 593b.

Figure 6:
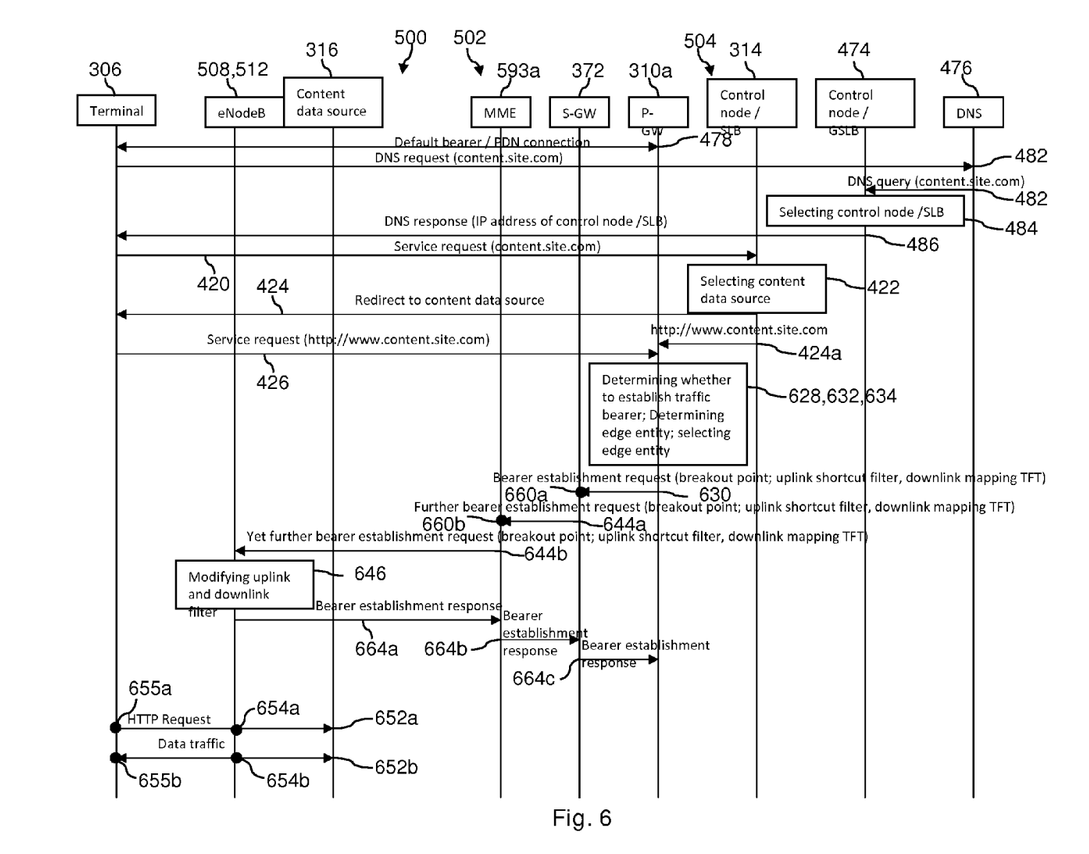
FIG. 6 is a flow diagram illustrating the method according to the fourth exemplary embodiment associated with the communication network in FIG. 5.

Referring to FIG. 6, the method starts with method steps 478-486, 420-426 explained with reference to FIG. 4. In a step 628, the P-GW 310a determines whether to establish a traffic bearer between the terminal 306 and the content data source 316. Since a default EPS traffic bearer between the terminal 306 and the P-GW 310a via the eNodeB 308a exists, the P-GW 310a determines to modify the existing traffic bearer. The P-GW 310a determines in a step 632 an edge entity of the mobile network 502 associated with the content data source 316 based on an identity of the content data source 316 received in a step 424 and/or in a step 424a. Accordingly the P-GW 310a identifies the eNodeB 508 to represent the edge entity which interfaces the mobile network 502 and the content data source 316 of the content data network 304.

Therefore, in a step 634, the P-GW 410a selects the eNodeB 508 as the edge entity 508, to be indicated in the bearer establishment request to be sent in a step 430 to the eNodeB 508. The bearer establishment request is a bearer modification request for modifying the established default EPS traffic bearer in the eNodeB 508. The bearer establishment request indicates the eNodeB 508 as the edge entity 508 associated with the bearer establishment request to be a breakout point for the data traffic between the mobile network 502 and the content data network 304, and includes a specification of an uplink data traffic filter and a specification of a downlink data traffic filter. The uplink data traffic filter is a shortcut data traffic filter, a Uplink Traffic Flow Template (UL TFT), and the downlink data traffic filter is a DL TFT. To this end, the network gateway 610a determines the UL TFT and the DL TFT based by data related information, for example a destination port number associated with the content data source 316 and/or a source port number associated with the terminal 306, acquired from a Policy and Charging Rules Function (PCRF) of the mobile network 502.

Upon reception of the bearer establishment request in a step 660a, the S-GW 372 determines whether a further bearer establishment request is to be sent to the MME 593a, i.e. whether the S-GW 372 is the indicated breakpoint point. As the S-GW 372 is not the edge entity 508, the determination is not in the affirmative, and the S-GW 372 sends in a step 644a the further bearer establishment request to the MME 593a. The further establishment request indicates the eNodeB 508 to be the edge entity 508 and the final recipient of the further bearer establishment request, and comprises the filter specifications.

The MME 590a determines in a step 660b, whether a yet further bearer establishment request is to be sent to the eNodeB 508, i.e. whether the MME 593a is the indicated edge entity 508. The determination is not in the affirmative, and the MME 593a sends in a step 644b the yet further bearer establishment request to the eNodeB 508. The yet further establishment request indicates the eNodeB 508 to be the edge entity and the final recipient of the further bearer establishment request, and comprises the filter specifications.

508. At reception of the yet further bearer establishment request, the eNodeB 508 successfully determines that the eNodeB 508 is the edge entity 508 associated with the traffic bearer, and modifies a downlink data traffic filter and an uplink data traffic filter, both being already available in the eNodeB 308a, based on the received specifications. Next, in steps 664a-c, bearer establishment responses are sent from the eNodeB 508 to the MME 593a, from the MME 593a to the S-GW 372, and from the S-GW 372 to the P-GW 310a, respectively. A radio traffic bearer is established between the terminal 406 and the eNodeB 508.

In a step 652a the terminal 306 sends a data request to the content data source 318 which is broken out by the eNodeB 508. To this end, the terminal 306 uses an uplink data traffic filter in the terminal 306, for example an UL TFT, to direct the data traffic onto the traffic bearer, as indicated by a circle 655a. Further, the eNodeB 508 uses, as indicated by a circle 654a, the modified uplink data traffic filter to map the latter against the data traffic from the terminal 306 towards the content data source 318 and, in a case of a match between both, forwards the data packets of the data traffic into the content data network 304. Thereupon, in a step 652b a communication between the terminal 306 and the content data source 318 via the eNodeB 508 is performed. In addition to the usage of the uplink data traffic filter by the terminal 306 and the eNodeB 508 which is indicated by circles 654b, 655b, respectively, and is performed similarly to the step 652a, the eNodeB 508 maps the downlink data traffic from the content data source 318 with the downlink data traffic filter, and, in case of a match of the latter both, encapsulates the data traffic into the traffic bearer, as indicated by the circle 654b.

Again referring to FIG. 5, the modified traffic bearer, referenced by the reference numeral 589, is established between the terminal 306 and the eNodeB 308a and excludes the P-GW 310a and the control nodes 593a, 372 of the core network 570. The modified traffic bearer to be used for the transporting of the data traffic associated with the content data source 316 may be part of the default EPS traffic bearer. The data traffic exchanged between the terminal 306 and the content data source 316 runs along a routing path 590 comprising the traffic bearer path and a routing path between the eNodeB 508 and the content data source 316. For comparison, a routing path 592 of data traffic exchanged between the terminal 306 and the content data source 316 using conventional procedures runs between the terminal 306 and the content data source 316 via the eNodeB 308a, the P-GW 310a, and the S-GW 372. A traffic bearer associated with the routing path 392 accordingly includes the latter mentioned entities and is similar to the default EPS traffic bearer in the step 478.

It is noted that in a case in which the content data source 316 is co-located with one of control nodes 508b-e of the radio access networks 366b, c, namely a TD NodeB 368b, a RNC 368c, a BTS 368d, and a BSC 368e, or the control node of the core network 570, the S-GW 372, this control node corresponds to the edge entity 512, and an associated network gateway is the GGSN 310b.

Figure 7:
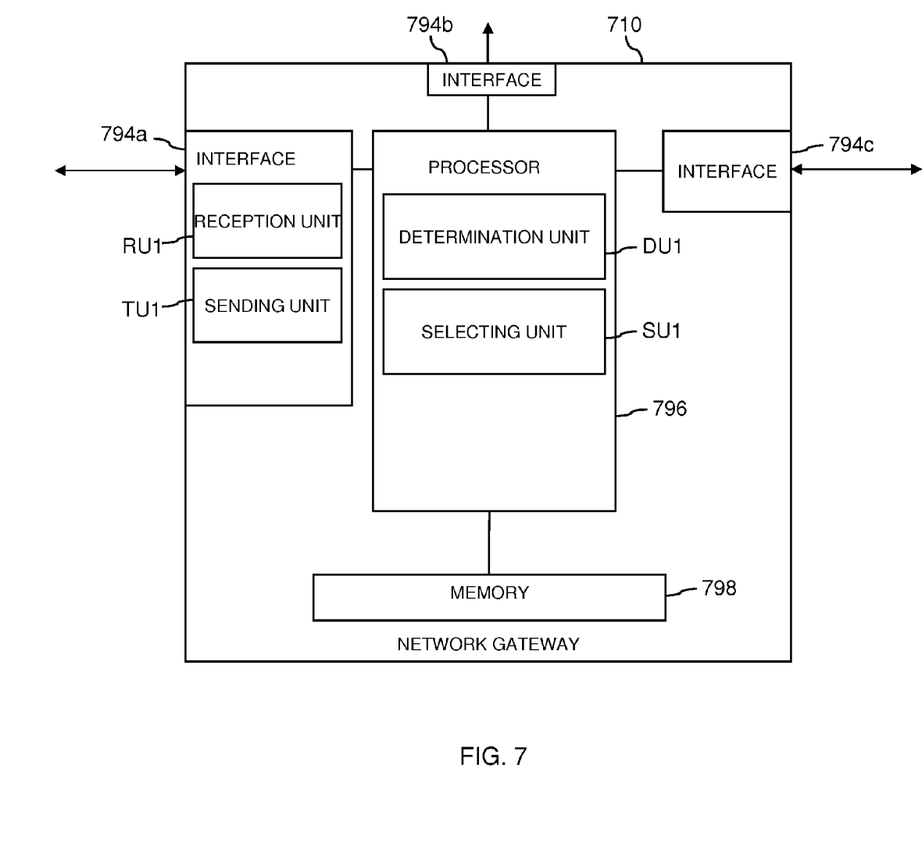
FIG. 7 is a block diagram illustrating a network gateway for determining a traffic bearer for data traffic between a terminal of a mobile network and a content data source of a content data network according to an exemplary embodiment.

Referring to FIG. 7, a network gateway 710 for determining a traffic bearer for data traffic between a terminal of a mobile network and a content data source of a content data network according to an exemplary embodiment will be explained. The network gateway 710 is part of the mobile network and comprises interfaces 794a-c adapted to communicate in association with a method for determining a traffic bearer for data traffic between a terminal of a mobile network and a content data source of a content data network as explained above. Further, the network gateway 710 comprises a processor 796 configured to process data associated with the method, and a memory 798 adapted to store data associated with the method.

The interface 794a comprises a reception unit RU1 adapted to receive a service request for data of the content data source from the terminal. A sending unit TU1 of the interface 794a is adapted to send a bearer establishment request to a control node of the mobile network for establishing the traffic bearer to an edge entity of the mobile network based on the received service request, particularly based on an output of the reception unit RU1. In this context, the edge entity is adapted to forward the data traffic between the content data source and the mobile network.

A determination DU1 of the processor 796 is adapted to determine whether to establish the traffic bearer based on the received service request, particularly based on an output of the reception unit RU1 andor to determine the edge entity of the mobile network based on the received service request, particularly based on an output of the reception unit RU1. A selection unit SU1 of the processor 796 is adapted to select the edge entity based on the determined edge entity, particularly based on an output of the determination unit DU1.

Figure 8:
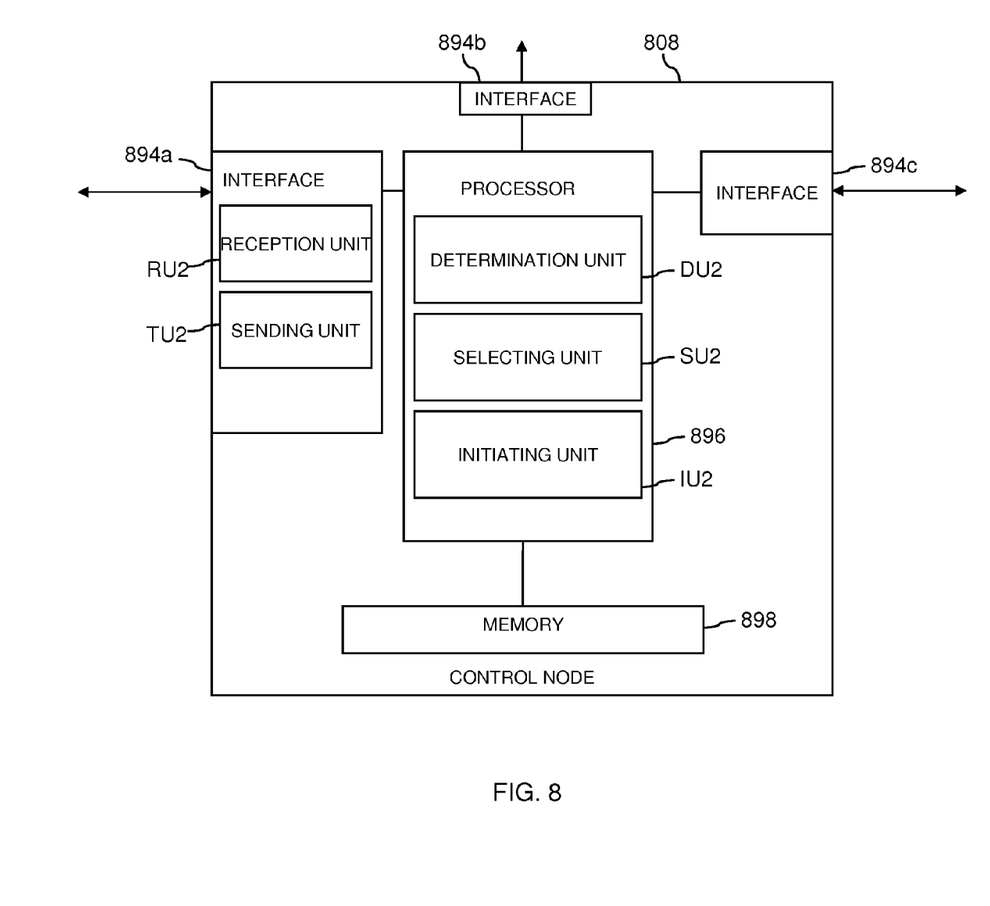
FIG. 8 is a block diagram illustrating a control node for determining a traffic bearer for data traffic between a terminal of a mobile network and a content data source of a content data network according to an exemplary embodiment.

Referring to FIG. 8, a control node 808 for determining a traffic bearer for data traffic between a terminal of a mobile network and a content data source of a content data network according to an exemplary embodiment will be explained. The control node 808 is part of the mobile network and comprises interfaces 894a-c adapted to communicate in association with a method for determining a traffic bearer for data traffic between a terminal of a mobile network and a content data source of a content data network as explained above. Further, the control node 808 comprises a processor 896 adapted to process data associated with the method, and a memory 898 configured to store data associated with the method. A reception unit RU2 of the interface 894a is adapted to receive a bearer establishment request for establishing the traffic bearer to an edge entity of the mobile network, which edge entity is adapted forward the data traffic between the content data source and the mobile network. An initiating unit IU2 of the processor 896 is adapted to initiate directing the data traffic associated with the content data source to the traffic bearer based on the received service request, particularly based on an output of the reception unit RU2.

In particular, an optional sending unit TU2 of the interface 894a is adapted to send a bearer establishment request to the edge entity. An optional determination unit DU2 of the processor 896 is adapted to determine the edge entity based on the received bearer establishment request, particularly based on an output of the reception unit RU2, and an optional selecting unit SU2 of the processor 896 is adapted to select the edge entity based on the determined edge entity, particularly based on an output of the determination unit DU2. The initiating unit IU2 may be adapted to cause the sending unit TU2 to send a request to the terminal to establish the traffic bearer and/or may be adapted to request an establishment or the modification of a data traffic filter for directing the data traffic to the traffic bearer. Alternatively, the initiating unit IU2 may be adapted to set or to modify a data traffic filter based on a bearer establishment request, and to use the data traffic filter when directing the data traffic between the terminal and the content data source.

It is noted that an association between the physical units 794a-c, 796, 798, 894a-c, 896, 898 of the network gateway 710 and the control node 808 and the functionally based units TU1, TU1, DU1, SU1, RU2, TU2, DU2, SU2, IU2 of the network gateway 710 and the control unit 808, respectively, may differ from the above described embodiments. For example, the sending unit SU1 of the network gateway 710 may form part of the interface 794a, the processor 796, and the memory 798.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the use of indefinite articles "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method performed by a network gateway node in a mobile network comprising:
  receiving a request for data from a mobile terminal operating in the mobile network, the request targeting a content data source associated with a content delivery network that is external to the mobile network and including an address of the content data source;
  determining that the address of the content data source is in the mobile network, thereby indicating that the content data source has an additional interface to the mobile network that is in addition to an interface provided by the network gateway node for reaching external data networks, including the content delivery network; and
  in response to said determining, generating a bearer establishment request that identifies the content data source and specifies a downlink data traffic filter for implementation in an edge node associated with the additional interface to the content data source, to thereby establish a traffic bearer for delivering the requested data through the edge node rather than through the network gateway node; and
  sending the bearer establishment request to a control node in the mobile network, thereby initiating establishment of the traffic bearer between the edge node and the mobile terminal, for directing the requested data from the content data source to the mobile terminal via the edge node.

2. The method of claim 1, wherein sending the bearer establishment request to the control node in the mobile network comprises sending the bearer establishment request to a Mobility Management Entity (MME) in the mobile network.

3. The method of claim 1, wherein sending the bearer establishment request to the control node in the mobile network comprises sending the bearer establishment request to a radio base station in the mobile network, said radio base station being co-located with or otherwise, comprising the edge node.

4. The method of claim 1, wherein the mobile network includes a plurality of control nodes and edge nodes, and wherein the method further comprises identifying the edge node based on the address of the content data source and known associations between edge nodes and content data source addresses, and identifying the control node based on known associations between edge nodes and control nodes.

5. The method of claim 1, further comprising receiving a bearer establishment response from the control node, indicating establishment of the traffic bearer between the edge node and the mobile terminal.

6. A network gateway node configured for operation in a mobile network and comprising:
  communication interface circuitry configured to provide a network interface for reaching external data networks, including a content delivery network, and to communicate with one or more other nodes within the mobile network;
  processing circuitry operatively associated with the communication interface circuitry and configured to:
    receive a request for data from a mobile terminal operating in the mobile network, the request targeting a content data source associated with a content delivery network that is external to the mobile network and including an address of the content data source;
    determine that the address of the content data source is in the mobile network, thereby indicating that the content data source has an additional interface to the mobile network that is in addition to the network interface of the network gateway node; and
    in response to said determination, generate a bearer establishment request that identifies the content data source and specifies a downlink data traffic filter for implementation in an edge node that is associated with the additional interface to the content data source, to thereby establish a traffic bearer for delivering the requested data through the edge node rather than through the network gateway node; and
    send the bearer establishment request to a control node in the mobile network, thereby initiating establishment of the traffic bearer between the edge node and the mobile terminal, for directing the requested data from the content data source to the mobile terminal via the edge node.

7. The network gateway node of claim 6, wherein the processing circuitry is configured to send the bearer establishment request to a Mobility Management Entity (MME) in the mobile network, as said control node.

8. The network gateway node of claim 6, the processing circuitry is configured to send the bearer establishment request to a radio base station in the mobile network, as said control node, and wherein the radio base station is co-located with or otherwise, comprises the edge node.

9. The network gateway node of claim 6, wherein the mobile network includes a plurality of control nodes and edge nodes, and wherein the processing circuitry is configured to identify the edge node based on the address of the content data source and known associations between edge nodes and content data source addresses, and identify the control node based on known associations between edge nodes and control nodes.

10. The network gateway node of claim 6, wherein the processing circuitry is configured to receive a bearer establishment response from the control node, indicating establishment of the traffic bearer between the edge node and the mobile terminal.

* * * * *